(12) United States Patent
Kludas

(10) Patent No.: US 8,581,978 B2
(45) Date of Patent: Nov. 12, 2013

(54) GEODETIC APPARATUS AND METHOD FOR CONTROLLING THE SAME

(75) Inventor: Torsten Kludas, Zottelstedt (DE)

(73) Assignee: Trimble Jena GmbH, Jena (DE)

( * ) Notice: Subject to any disclaimer, the term of this patent is extended or adjusted under 35 U.S.C. 154(b) by 391 days.

(21) Appl. No.: 12/874,973

(22) Filed: Sep. 2, 2010

(65) Prior Publication Data

US 2011/0211063 A1 Sep. 1, 2011

Related U.S. Application Data

(63) Continuation of application No. PCT/EP2008/001796, filed on Mar. 6, 2008.

(51) Int. Cl.
*H04N 7/18* (2006.01)
*G01J 1/20* (2006.01)

(52) U.S. Cl.
USPC ........... 348/135; 348/106; 348/136; 348/137; 250/203.1

(58) Field of Classification Search
USPC ....................................... 348/135
See application file for complete search history.

(56) References Cited

U.S. PATENT DOCUMENTS

| | | | |
|---|---|---|---|
| 4,560,270 A | 12/1985 | Wiklund et al. | |
| 5,051,934 A | 9/1991 | Wiklund | |
| 5,440,112 A * | 8/1995 | Sakimura et al. | 250/203.1 |
| 5,767,952 A | 6/1998 | Ohtomo et al. | |
| 5,936,736 A * | 8/1999 | Suzuki et al. | 356/624 |
| 6,137,569 A | 10/2000 | Sasaki et al. | |
| 2003/0048355 A1 * | 3/2003 | Shimoyama et al. | 348/79 |
| 2005/0275830 A1 * | 12/2005 | Ohtomo et al. | 356/141.1 |
| 2011/0043620 A1 * | 2/2011 | Svanholm et al. | 348/135 |

FOREIGN PATENT DOCUMENTS

| | | |
|---|---|---|
| CN | 1707222 A | 12/2005 |
| EP | 1 293 755 A1 | 3/2003 |
| EP | 1 503 176 A2 | 2/2005 |
| EP | 1 605 231 A1 | 12/2005 |
| JP | 07-229742 A | 8/1995 |
| JP | 11-304465 A | 11/1999 |
| JP | 2002-98529 A | 4/2002 |

OTHER PUBLICATIONS

Office Action in the counterpart Chinese Application No. 200880127850.0, dated Aug. 23, 2011, 9 pages.
International Search Report and Written Opinion of PCT Patent Application No. PCT/EP2008/001796, dated Dec. 4, 2008, 9 pages total.

* cited by examiner

*Primary Examiner* — Joseph Ustaris
*Assistant Examiner* — On S Mung
(74) *Attorney, Agent, or Firm* — Kilpatrick Townsend & Stockton LLP

(57) ABSTRACT

A geodetic apparatus for performing measurements using a target and a method for controlling the geodetic apparatus is disclosed. The apparatus comprises a detector for measuring a position of the target relative to a sighting axis of the apparatus, a light emitter for outputting to an outside of the geodetic apparatus a first cone of light having a first wavelength and a second cone of light having a second wavelength different from the first wavelength, and a controller connected to both the detector and the light emitter. The first cone of light overlaps with the second cone of light at the distance of one meter from the apparatus by at least 30%. The controller is configured to control the light emitter based on the detected position of the target to output at least one of the first cone of light and the second cone of light.

30 Claims, 7 Drawing Sheets

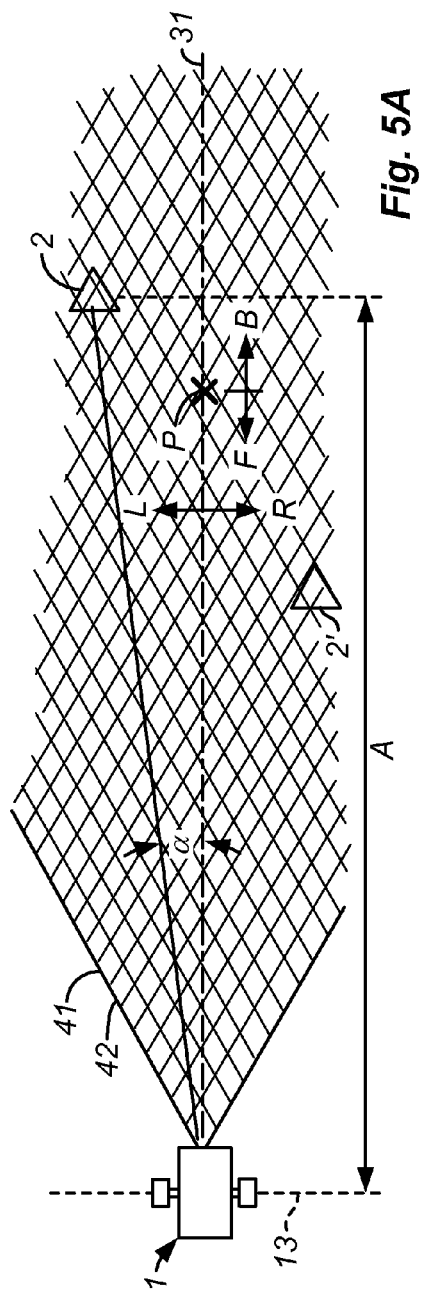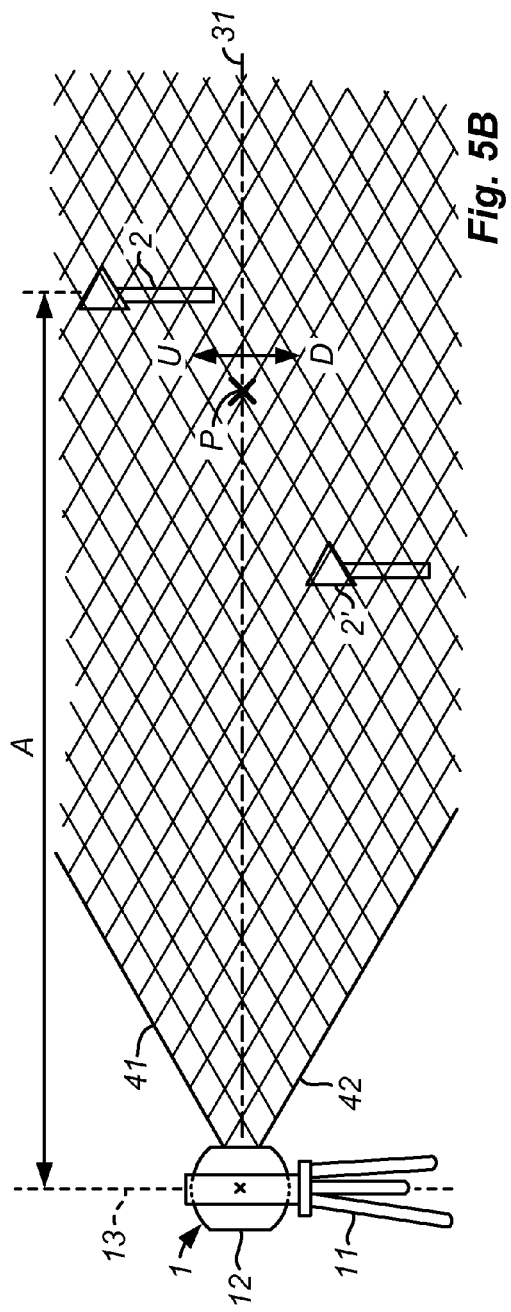

GEODETIC APPARATUS AND METHOD FOR CONTROLLING THE SAME

CROSS-REFERENCES TO RELATED APPLICATIONS

This application claims priority to and is a continuation of International Patent Application No. PCT/EP2008/001796, filed on Mar. 6, 2008, the disclosure of which is hereby incorporated by reference in its entirety for all purposes.

BACKGROUND OF THE INVENTION

The present invention relates to a geodetic apparatus for performing measurements with respect to a target. Such a geodetic apparatus may be a tachymeter, a theodolite, a total station or a surveyor's level, or a combination thereof, for example.

The target may be a measuring rod such as a ranging-pole or a leveling staff, for example. The ranging-pole allows detection of the same in a field of view of the geodetic apparatus and thus mainly serves for angle and distance measurement. The leveling staff additionally has a pattern (similar to a digital chain) thereon that can be read out by the geodetic apparatus to indicate a relative height between the leveling staff and the geodetic apparatus (provided a sighting axis of the apparatus is arranged in a truly horizontal plane). To facilitate measurement, the measuring rod may be provided with a reflecting surface or a pattern of two or more portions having different reflection capabilities. Further, the measuring rod may be provided with an additional reflector. Furthermore, the measuring rod may be painted by using a typical color or pattern of two or more different colors. Alternatively, the target may even be a prism, an active target emitting a signal, an arbitrary object, or a landmark, for example. Usage of a prism as target provides a high accuracy when used in combination with an electronic distance measuring device (EDM), for example. Usage of an active target may facilitate tracking of the target.

Such a geodetic apparatus is used in surveying and mapping and construction engineering, for example. It is suitable in any field requiring at least one of distance measurement, position measurement, goniometry (measurement of angles) and measurement of a relative height difference with respect to the target. Moreover, it may be used to transfer geometric points from e.g. a technical drawing to the "real world"-environment (e.g. when setting out boundary marks).

When using a geodetic apparatus in combination with a target it is necessary to locate the target in a field of view of the geodetic apparatus. This can be performed either by adjusting the orientation of the geodetic apparatus or by adjusting the position of the target, depending on whether the actual position of the target or a preset position stored in the geodetic apparatus is to be the point of reference (even called geodetic point) for the measurement.

The field of view of the geodetic apparatus depends on the measurement unit of the geodetic apparatus. In case of an optical geodetic apparatus, the field of view depends on the optics of the geodetic apparatus and can frequently be altered from a near-field measurement to a far-field measurement by using adjustable lenses (such as liquid lenses or a zoom lens arrangement). In the present document, the field of view is the spatial area in which the geodetic apparatus is capable of performing measurements with respect to the target without changing the orientation of the geodetic apparatus. Alignment between the target and the geodetic apparatus is achieved when the target is located in a preset position of the field of view of the geodetic apparatus. The straight line between the preset position and the apparatus is called sighting axis. This sighting axis is frequently provided in the middle of the field of view of the geodetic apparatus. A reticule in a display or ocular of the apparatus often visually symbolizes this sighting axis. The sighting axis may be predefined by optics of the apparatus or even be defined dynamically in dependency to the location of the preset position in the field of view of the apparatus.

The present application deals with the case where the preferences of the geodetic apparatus regarding at least one of orientation, distance and height of the target relative to the apparatus are the point of reference for the measurement. Thus, the position of the target has to be adjusted in dependency on preferences given by the geodetic apparatus by moving the target until the target is located at a preset position. At the beginning, the target usually is separated from the sighting axis (even called sighting direction) of the apparatus and thus the preset position in various directions by different distances. This distance relative to the sighting axis, and especially to the preset position, frequently is called offset.

Traditionally, such an adjustment of the position of the target to the geodetic apparatus requires the presence of two users interacting with one another. A first user alters the position of the target while the second user operates the geodetic apparatus to check whether the target is located at the preset position relative to the geodetic apparatus. The first user advises the second user to alter the position of the target until the target is positioned at the present position (with respect to at least one of angle, distance and height) with respect to the geodetic apparatus.

This traditional approach has the disadvantage that the presence of at least two interacting people is necessary to adjust the position of the target with respect to the geodetic apparatus. This is frequently difficult as a distance between the user operating the geodetic apparatus and the user carrying the target might be very long. It would be extremely time consuming for one user to perform such adjustments of the position of the target on their own, as the single user in turn would have to alter the position of the target and operate the geodetic apparatus.

To overcome this problem, a geodetic apparatus provided with auxiliary means for facilitating the setting out of boundaries is described in the U.S. Pat. No. 4,560,270. This apparatus comprises a one-way sound transmitting facility, by means of which audible instructions can be sent from the measuring apparatus to a user carrying a measuring rod comprising a prism. This facility enables the operator of the apparatus to verbally direct the user carrying the measuring rod to the desired boundary mark. Furthermore, this apparatus is also provided with a line-sighting instrument mounted in a fixed position in relation to the apparatus but not connected electronically to it. The line-sighting instrument continuously emits two slightly diverging light beams of mutually different character. The two light beams overlap in a narrow central zone. The user then moves the measuring rod to a point on the plot within the central zone at which the two light beams transmitted from the direction indicating unit of the instrument overlap and at which the prism is in alignment with the sighting axis of the measuring apparatus.

It is crucial with the geodetic apparatus comprising the line-sighting instrument known from the prior art that the narrow central zone of the line-sighting instrument perfectly aligned with a sighting axis and measuring path, respectively, of the geodetic apparatus. Moreover, the line-sighting instrument has to guarantee that the two light beams overlap in a very narrow central zone, both in case of a near-field measurement and of a far-field measurement. Even at the maximum working distance between the prism and the apparatus the central zone in which the two different light beams overlap may not be significantly larger than the measuring path of the apparatus. In consequence, the optics of the line-sighting instrument has to be both of sufficient quality and has to be aligned perfectly with the measuring path of the apparatus. This results in considerable manufacturing costs for the line-sighting instrument. Furthermore, there is a substantial risk that the line-sighting instrument becomes misaligned during use and thus has to be justified again. Further, due to the narrow central zone, a user located on either side of the central zone is only capable to see either one of both light beams. The light-sighting instrument must emit both light beams constantly.

A geodetic instrument using the above line-sighting instrument is known from U.S. Pat. No. 5,051,934. According to this prior art, a distance measuring instrument has a prism tracking facility, which holds the instrument automatically in constant alignment with a prism carried on a setting-out rod, when the prism is located in the path of a measuring beam emitted from an electronic distance meter EDM incorporated in the measuring instrument. Thus, the prism is constantly maintained in a measurement axis of the EDM by automatically rotating the instrument about a vertical and a horizontal axis. The EDM takes continuous measurements against the prism carried on the setting-out rod, as the prism bearer carries around the rod and prism. The instrument is also provided with a horizontal angle indicator that indicates the bearing of the EDM in a horizontal direction, i.e., the horizontal angle in relation to a reference angle position, and also with a vertical angle indicator that indicates the vertical angle of the EDM in relation to a horizontal plane. The instrument calculates the horizontal distance and the height differential on the basis of the EDM's measuring result and the signal given by the vertical angle detector. The measured values of horizontal length, horizontal angle and height difference are compared with setting-out point data input to the instrument before the measuring. Thus, preset target values for the horizontal and vertical angle indicator as well as the EDM are compared with actual values output by the horizontal and vertical angle indicator as well as the EDM. The result of this comparison is fed to an indicator, which produces an optical signal that can be readily discerned by the prism bearer and which has mutually different coding indicating whether and how the prism should be moved in order to be located from a starting point to the preset setting-out point different from the starting point. The setting-out point has been reached as soon as the preset values for the horizontal and vertical angle indicator as well as the EDM match with the actual output values by the horizontal and vertical angle indicator as well as the EDM. As an example it is proposed that this coding is such that the indicator produces a red light if the prism needs to be moved to the right and a green light if the prism needs to be moved to the left to be located at the next setting-out point. Alternatively it is proposed to transmit a Morse code. According to an example, the indicator emits two light beams of different colors (e.g. green and red) that are slightly divergent, such that the light beams overlap in a narrow central zone to indicate a measurement axis of the instrument to the user carrying the prism.

It is a disadvantage with this prior art that the tracking of the prism in the path of a measuring beam emitted from an electronic distance meter of the instrument is difficult. The instrument has to be tilted constantly about two orthogonal axes to keep the prism in alignment with the narrow measuring beam emitted from an electronic distance meter along the measurement axis. Thus, there is a high risk that the tracking fails and has to be repeated. This means that the user has to return to the instrument and to manually operate the instrument to bring the measuring beam into alignment with the prism before a new tracking can be performed. This is very time consuming if the distance between the instrument and the prism is large. Alternatively, the line-sighting instrument described with respect to U.S. Pat. No. 4,560,270 may be used to bring the prism in alignment with the measuring beam. In this case, the instrument known from U.S. Pat. No. 5,051,934 suffers from the same problems as the line-sighting instrument. Without this line-sighting instrument, it would be impossible to arrange the prism in the measuring beam emitted from the EDM to start the tracking procedure without manually aligning the instrument to the prism.

SUMMARY OF THE INVENTION

Starting from the above prior art documents, it is an object of the present invention to provide a geodetic apparatus and method for controlling the same, which avoids the above deficiencies of the prior art.

According to embodiments, it is the object of the present invention to provide a geodetic apparatus and method for controlling the same that facilitates alignment of a target with a sighting axis of the apparatus, by manipulating only the target while maintaining the orientation of the sighting axis constant.

According to embodiments, a geodetic apparatus for performing measurements using a target is disclosed. The apparatus comprises a detector for measuring a position of the target relative to a sighting axis of the apparatus and thus for measuring an offset (relative distance) between the target and the sighting axis. The sighting axis generally is the straight line between a preset position stored in the apparatus and the apparatus. In case an optical geodetic apparatus is used, this sighting axis may coincide with the optical axis of optics of the apparatus or be defined by a certain region of an optical detector (e.g. an image sensor or four-quadrant-detector) used in the apparatus, for example. The apparatus further comprises a light emitter for outputting from the apparatus a first cone of light having a first wavelength and a second cone of light having a second wavelength different from the first wavelength. The first and second wavelengths differ by an amount such that the first and second cones of light have different colors distinguishable by a distant user. The first cone of light overlaps with the second cone of light at the distance of one meter from the apparatus by at least 30%. Alternatively, this overlap even may be at least 50%. Thus, the orientation of radiation of the first and second cone of light is very similar. The apparatus further comprises a controller connected to both the detector and the light emitter. The controller is configured to control the light emitter based on the detected position of the target to output at least one of the first cone of light and the second cone of light.

Similarly, according to an embodiment, a method for controlling a geodetic apparatus when performing measurements using a target comprises measuring the position of the target relative to a sighting axis of the apparatus and outputting from the apparatus at least one of a first cone of light having a first wavelength and a second cone of light having a second wavelength different from the first wavelength. The first cone of light overlaps with the second cone of light at the distance of one meter from the apparatus by at least 30%. Alternatively, this overlap even may be at least 50%. Furthermore, the first and second cones of light are output selectively based on the detected position of the target.

The first and second cones of light may be output alternatively or simultaneously.

As the apparatus and method measure an offset of the position of the target with respect to the sighting axis of the apparatus and selectively output the first and second cones of light in dependency on the detected offset, the target can be aligned with the sighting axis of the apparatus by simply manipulating the target as indicated by the cones of light. It is not necessary to additionally manipulate the apparatus to bring the sighting axis of the apparatus in line with the target, provided the target is arranged within a field of view of the detector. Therefore, an orientation of the apparatus and thus of the sighting axis can be maintained constant during alignment of the target. As there is no need to operate the apparatus, only one single user is sufficient to bring the target into alignment with the apparatus.

As the first and second cones of light overlap to a large extend, both the first and second cones of light simultaneously are within a field of view of a distant user. No complicated optics is required to direct the first and second cones of light in special directions or to align the cones of light with a sighing axis of the apparatus. Therefore, the light emitter and thus the geodetic apparatus have a very simple and robust structure and can be manufactured at low cost. It is obvious that the present invention is not restricted to the use of only two cones of light having different wavelengths. More than two cones of light having different wavelengths may be used instead.

To be distinguishable by a distant user, according to embodiments the colors of the cones of light differ in the CIELAB color space by at least 50 units with respect to at least one of the coordinates a* and b*. According to an alternative embodiment, the wavelengths of the cones of light differ from one another by at least 50 nm, especially 100 nm, and further especially 150 nm to be easily distinguished even by a distant user. According to an embodiment, the first wavelength is in the blue range or green range of visible light whereas the second wavelength is in the red range of visible light. The wavelengths of the cones of light are within the range from 380 nm to 780 nm of visible light.

According to another embodiment, the apparatus further comprises a chassis and an objective lens. The objective lens defines the optical axis for the detector and the apparatus. Optionally, the optical axis may coincide with the sighting axis. The light emitter is located adjacent to the objective lens on the chassis. Optics comprising an objective lens is broadly used in combination with optical detectors. Due to the arrangement of the light emitter adjacent to the objective lens on the chassis it is guaranteed that a user manipulating the target can see the light emitter as long as the target (and thus even the user) is in the field of view of the apparatus. Moreover, as the sighting axis frequently coincides with the optical axis of the objective lens the above arrangement guarantees that the light emitter is even arranged next to the sighting axis.

Furthermore, according to an embodiment the light emitter comprises plural light sources emitting the first cone of light and the second cone of light. Furthermore, the light sources are arranged on the chassis surrounding the objective lens and thus close to the sighting axis. The usage of plural light sources for emitting the first and second cone of light is an easy and reliable way to increase the intensity, and thus visibility, of the first and second cones of light. Furthermore, due to the redundancy of light sources the apparatus still may be used if one light source is out of order.

According to an embodiment, the light emitter comprises a first light source emitting the first cone of light and a second light source emitting the second cone of light. Thus, the first and second cones of light are emitted by different light sources in this embodiment. Using light sources emitting white light in combination with different filters, or using different light sources each emitting light of different wavelengths and thus colors may be used, for example. The light sources may be Light Emitting Diodes (LEDs), bulbs, discharge lamps or glow lamps, for example.

To further increase the intensity of both the first and second cones of light the light emitter comprises plural pairs of first and second light sources according to an embodiment.

In this respect, the first and second light sources may be arranged alternatively to each other according to an embodiment. This arrangement allows spreading out the light sources over a chassis of the apparatus. Thus, visibility of the light emitter is further increased. Alternatively, the first light sources may be arranged in a first cluster and the second light sources may be arranged in a second cluster different from the first cluster, for example.

According to a further embodiment, the light emitter comprises at least one common light source alternatively emitting the first cone of light and the second cone of light. For example, a light source emitting white light in combination with varying filters or a LED capable of selectively emitting light of different wavelengths might be used. As one single light source is used for emitting both the first and second cone of light, the number of parts of the apparatus and thus manufacturing costs is reduced.

According to an embodiment, the detector comprises an image sensor and optics for generating a two-dimensional image on the image sensor, the image sensor converting the two-dimensional image to an electric signal. This image sensor might be a four-quadrant-detector or a CCD-sensor or CMOS-sensor, for example. The optics may additionally be capable of providing a focusing or zoom functionality, for example. In this embodiment, the controller is further configured to detect the position of the target relative to the sighting axis of the apparatus by identifying a position of a representation of the target in the signal output by the image sensor, and by comparing the identified position of the representation of the target with a reference position corresponding to the sighting axis. This reference position is defined relative to the image sensor. The reference position may coincide with the sighing axis of the apparatus and the optical axis of the optics, for example.

When a four-quadrant-detector is used as image sensor, this reference position may be defined as the range in which angles of the four quadrants meet, for example. Thus, the position of the target may be judged by detecting whether the representation of the target is mainly arranged on certain quadrants of the four-quadrant-detector instead of equally covering all four quadrants. When a CCD-sensor or CMOS-sensor is used as image sensor, this reference position may be a reference pixel and especially the central pixel of the detector, for example. In this respect, digital picture processing can be used to detect the pixels of the sensor corresponding to the representation of the target, for example. The locations of these pixels on the sensor may be compared to the location of the reference pixel to judge the position of the target with respect to the sighting axis, for example. According to an embodiment, this image sensor may be part of a calibrated digital camera.

Using only the output of the image sensor can identify the position of the target relative to the sighting axis in the above embodiment. Thus, it is not necessary to additionally consider an orientation of the geodetic apparatus or an orientation of the sighting axis in this respect.

According to an embodiment, the controller is configured to control the light emitter such that only the first cone of light is output if the position of the target is judged to be displaced in a first direction relative to the sighting axis of the apparatus. Further, the controller is configured to control the light emitter such that only the second cone of light is output if the position of the target is judged to be displaced in a second direction opposite to the first direction relative to the sighting axis of the apparatus.

Based on the output first and second cones of light, respectively, a distant user manipulating the target can judge with ease whether the target is offset in the first or second direction with respect to the sighting axis, due to the different wavelength and thus colors of the first and second cones of light. These first and second directions may identify an offset to the left or right or an offset up or down or an offset backwards or forwards with respect to the sighting axis, for example.

According to a further embodiment, the controller is configured to control the light emitter such that at least one of the first and second cone of light is output as intermittent light of alternating on and off pulses. The duration of the on and off pulses corresponds to a first pattern if the position of the target is judged to be displaced in a third direction relative to the sighting axis of the apparatus. Further, the duration of the on and off pulses corresponds to a second pattern different from the first pattern if the position of the target is judged to be displaced in a fourth direction relative to the sighting axis of the apparatus. The duration of each single one of the on and off pulses is more than 0.6 second and thus can be easily recognized by a user. Alternatively, the duration of each single one of the on and off pulses may be more than 1.0 second.

Based on the output first and second pattern, respectively, of on and off pulses a distant user manipulating the target can judge with ease whether the target is offset in the third or forth direction with respect to the sighting axis. These third and forth directions may identify an offset up or down or backwards or forwards or to the left or right with respect to the sighting axis, for example. The first and second pattern may differ in at least one of the length of on pulses and the length of off pulses. The first and second pattern even may identify different Morse codes, for example. It is obvious that the present invention is not restricted to the usage of only two different patterns of on and off pulses of light.

According to an embodiment, the controller is configured to control said light emitter such that both the first cone of light and the second cone of light is output if the position of the target is judged to be at a preset position relative to the sighting axis of the apparatus.

Thus, the distant user manipulating the target is actively informed that the target has reached the preset position with respect to the sighting axis of the apparatus. It is emphasized that the present invention is not restricted to this outputting of both the first and second cones of light when the target has reached the preset position. The user might be notified in another way that the position of target corresponds to the preset position, e.g. by alternating output of the first and second cones of light at a preset interval, by blinking both the first and second cones of light or by not outputting of a cone of light at all, for example.

According to an embodiment, the detector is capable of measuring the position of the target relative to the sighting axis of the apparatus by measuring at least one of an angle and distance and height of the target relative to the sighting axis of the apparatus. The relative distance and thus offset of the target from the sighing axis can be detected either directly (e.g. by measurement of distance between target and sighting line with respect to detector) or implicitly (e.g. by measurement of angle between sighting axis and straight line between apparatus and target in combination with measurement of distance of target). It is frequently sufficient to simply detect on which side of the sighting axis the target is located with respect to a certain position on a detector used by the apparatus. It is obvious that the apparatus may even contain multiple detectors for the above measurements or perform additional measurements with respect to the target. For example, an electronic distance meter EDM may be used to measure the distance of the target (e.g. prism) whereas an angle between sighting axis and straight line between apparatus and target may be measured by identifying the position of the representation of the target (e.g. prism or measuring rod carrying the prism) in the signal output by an image sensor of the apparatus.

According to an embodiment, the cone of light is defined by the angular range comprising 50% of the intensity of light output by the light emitter. Alternatively, the cone of light is defined by the angular range comprising 70% of the intensity of light output by the light emitter. This may be measured at a distance of one meter, for example.

According to an embodiment of the method, the apparatus comprises an image sensor and optics for generating a two-dimensional image on the image sensor, the image sensor converting the two-dimensional image to an electric signal. In this case, the measuring of the position of the target relative to the sighting axis of the apparatus comprises identifying a position of a representation of the target in the signal output by the image sensor and comparing the identified position of the representation of the target with a reference position corresponding to the sighting axis. The reference position is defined relative to the image sensor.

The output of the image sensor is sufficient to identify the position of the target relative to the sighting axis in the above embodiment. Thus, it is not necessary to additionally consider an orientation of the sighting axis of the geodetic apparatus in this respect.

According to a further embodiment of the method, the measuring of the position of the target relative to the apparatus comprises judging if the position of the target is displaced relative to the sighting axis of the apparatus in a first direction or in a second direction opposite to the first direction. Furthermore, the outputting of at least one of the first and second cone of light comprises outputting only the first cone of light if the target is judged to be displaced in the first direction, and outputting only the second cone of light if the target is judged to be displaced in the second direction.

According to a further embodiment of the method, the measuring of the position of the target relative to the sighting axis of the apparatus comprises judging if the position of the target is displaced relative to the sighting axis of the apparatus in a third direction or in a fourth direction opposite to the third direction. Moreover, the outputting of at least one of the first and second cone of light comprises outputting at least one of the first and second cone of light as alternating on and off pulses, wherein the duration of the on and off pulses corresponds to a first pattern if the position of the target is judged to be displaced in the third direction and the duration of the on and off pulses corresponds to a second pattern different from the first pattern if the position of the target is judged to be displaced in the fourth direction. The duration of each single one of the on and off pulses is more than 0.6 second.

Based on at least one of the output first or second cone of light and on the output first or second pattern of on and off pulses, a distant user manipulating the target can judge with ease whether the target is offset in the first, second, third or forth direction with respect to the sighting axis.

According to an embodiment, the measuring of the position of the target relative to the sighting axis of the apparatus comprises judging if the position of the target relative to the apparatus corresponds to a preset position. The outputting of at least one of the first and second cone of light comprises outputting both the first and second cone of light if the position of the target is judged to correspond to the preset position to actively inform a distant user manipulating the target that the target has reached the preset position with respect to the sighting axis of the apparatus.

The measuring of the position of the target relative to the sighting axis of the apparatus comprises measuring at least one of an angle and distance and height of the target relative to the sighting axis of the apparatus, according to an embodiment. Thus, the relative distance and thus offset of the target relative to the sighting axis may be measured either directly or indirectly. Alternatively, it may be simply measured on which side of the sighting axis the target is currently located, for example.

BRIEF DESCRIPTION OF THE DRAWINGS

In the following, preferred embodiments of the present invention are described in more detail by reference to the enclosed drawings, in which similar or same elements are denoted by similar or the same reference signs. In the drawings.

FIG. 5A is a schematic top view on the geodetic apparatus and two position of targets during operation of the geodetic apparatus of FIG. 1;

FIG. 5B is a side view thereof;

DETAILED DESCRIPTION OF THE INVENTION

In the following, embodiments of a geodetic apparatus according to the present invention are described by reference to the enclosed drawings.

Figure 1:
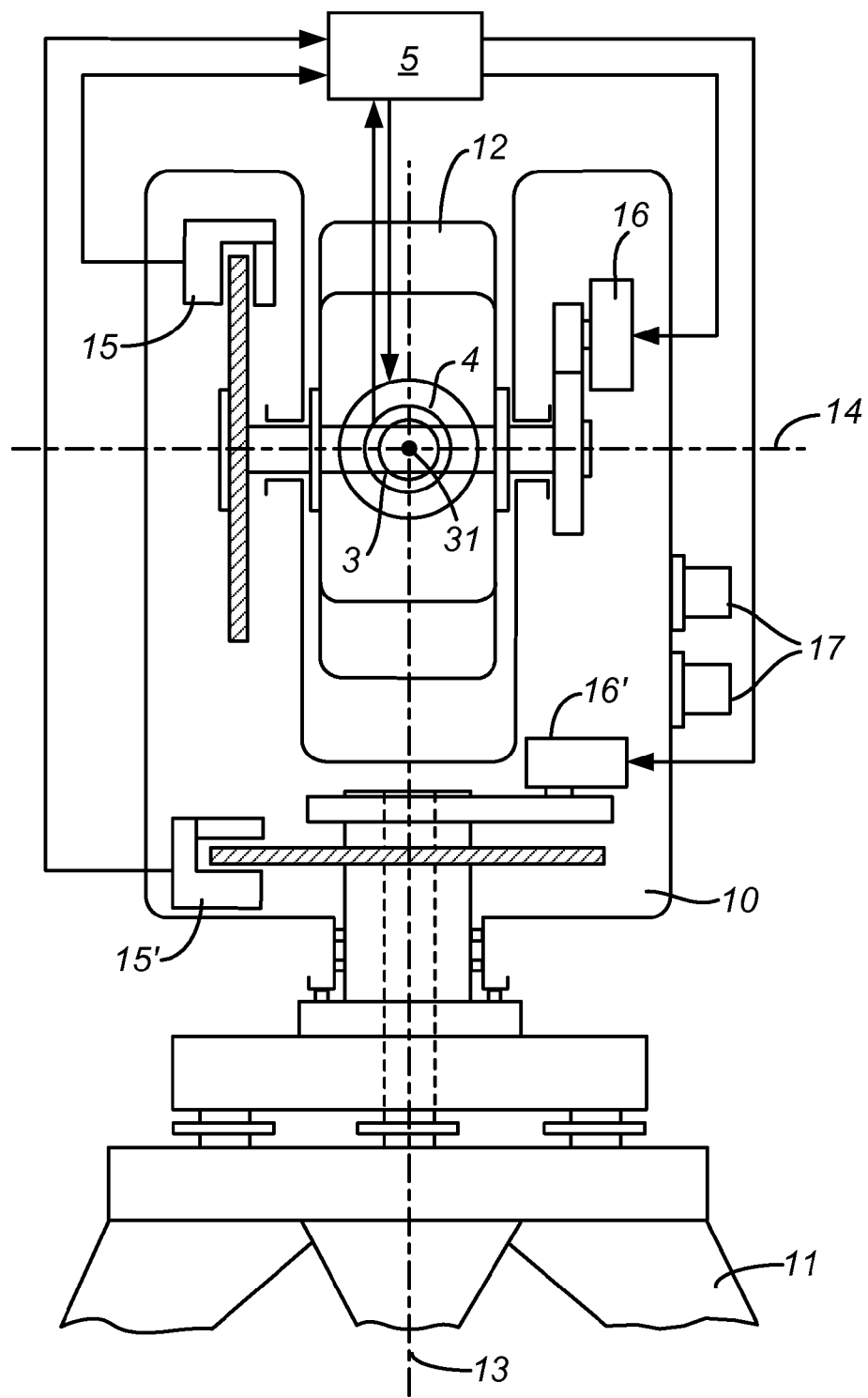
FIG. 1 is a schematic front view of a geodetic apparatus according to an embodiment of the present invention.

In the embodiment shown in FIG. 1, the geodetic apparatus 1 is a digital video-tachymeter including an electronic distance meter, a vertical angle meter, a horizontal angle meter and a height meter. The various meters are realized by one telescope 3 in combination with a central controller 5 connected to the telescope 3.

Furthermore, the target 2 (shown in FIGS. 5A, 5B) is a measuring rod. The measuring rod carries a prism. The electronic distance meter uses the prism for accurate distance measurement.

As is shown in FIG. 1, the geodetic apparatus 1 consists of a telescope 3 contained in a measurement unit 12 mounted on a tripod 11. The measurement unit 12, and thus even the telescope 3, is pivotable about two orthogonal pivoting axes 13 and 14 by respectively using stepper motors 16', 16. The angle of rotation about the vertical pivoting axis 13 is measured by sensor 15' whereas the angle of rotation about the horizontal pivoting axis 14 is measured by sensor 15. Optical elements of the telescope 3 define an optical axis of the apparatus. In the embodiment shown in FIG. 1, this optical axis coincides with a sighting axis 31 of the apparatus 1. The sighting axis 31 is the straight line between a preset position and the apparatus 1. A light emitter 4 is located adjacent the sighting axis 31 on a chassis of the measurement unit 12.

Figure 2:
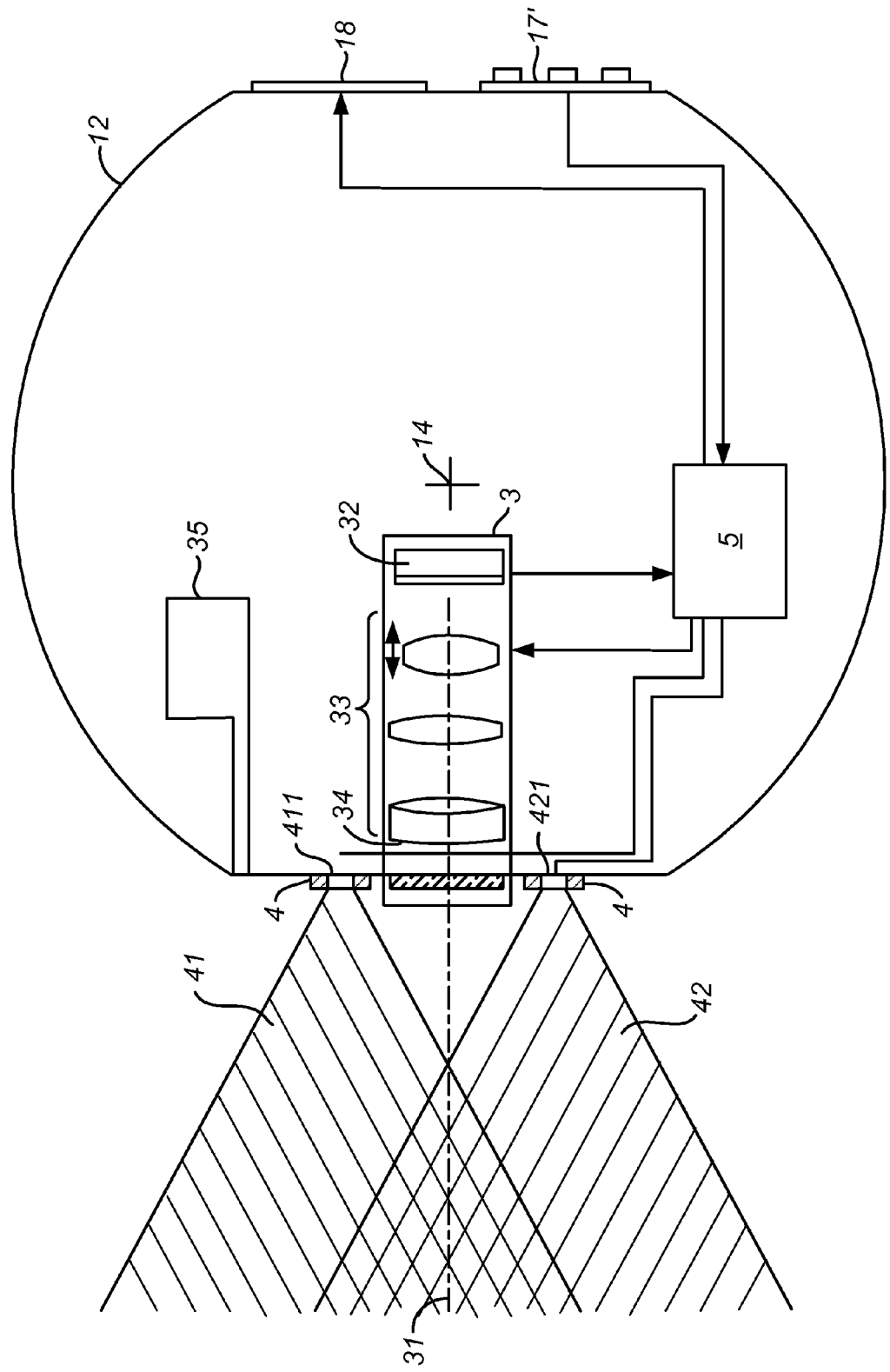
FIG. 2 is a schematic cross sectional view of a measurement unit of the geodetic apparatus of FIG. 1.

As is shown in FIG. 2, the controller 5 is arranged in the chassis of the measurement unit 12. In the present embodiment, the controller 5 is a microprocessor. The telescope 3, first and second light sources 411, 421 of the light emitter 4, the sensors 15, 15' and the stepper motors 16, 16' are connected to the controller 5. Further, a display 18 and user interface 17, 17' are connected to the controller 5. In the embodiment shown in FIG. 2, the measurement unit further comprises an additional separate distance detector 35 (electronic distance meter) in addition to the telescope 3 for performing electronic distance measurement. Alternatively or additionally, an electronic distance meter (not shown) partially using the same optics as the telescope 3 may be provided.

The light emitter 4 comprises first and second light sources 411 and 421. The first light source 411 is capable of emitting a first cone of light 41 having a first wavelength. The second light source 421 is capable of emitting a second cone of light 42 having a second wavelength different from the first wavelength.

The first and second wavelengths are selected such that the first and second cones of light 41, 42 have different colors. To be distinguishable by a distant user, the colors of the cones of light differ in the CIELAB color space by 70 units of the coordinates a* and b* in the present embodiment. However, it is believed to be sufficient if the cones of light differ in the CIELAB color space by at least 50 units with respect to at least one of the coordinates a* and b*. According to an alternative embodiment, the wavelengths of the cones of light differ from one another by at least 150 nm to be easily distinguished even by a distant user. However, near the yellow range of visible light it is believed to be sufficient if the wavelengths differ by at least 50 nm to have distinguishable colors.

In the present embodiment, the first wavelength is in the green range of visible light whereas the second wavelength is in the red range of visible light. Thus, the wavelengths of the cones of light are within the range from 380 nm to 780 nm of visible light.

As is obvious from FIG. 2, the first and second cones of light 41 and 42 overlap with each other significantly. The amount of overlap is such that the cones overlap by more than 45% at a distance of one meter from the apparatus 1. In this respect, the cones of light 41, 42 are defined by the angular range comprising 60% of the intensity of light output by the respective light source 411, 421.

However, according to an alternative embodiment it is sufficient if the overlap of the first and second cones of light 41 and 42 is only 30%. Moreover, according to an alternative embodiment, the cone of light is defined by the angular range comprising 70% or even only 50% of the intensity of light output by the light emitter. This may be measured at a distance of one meter, for example.

The telescope 3 has an image sensor 32 as detector and optics 33 for generating a two-dimensional image on the image sensor 32. The image sensor 32 converts a visual image generated by the optics 33 on a surface of the image sensor to an electric signal. Distances between some lenses of the optics 33 are changeable to provide both a focusing and zoom functionality.

In the Figures, reference sign 34 denotes the objective lens of the optics 33. The optical axis of the objective lens 34 coincides with the sighting axis 31 of the telescope 3. However, the present invention is not restricted to sighting axes 31 coinciding with an optical axis of an objective lens of a telescope.

The sighting axis 31 frequently is also called nominal staking out direction. The optical axis of the objective lens 34 is the imaginary line that defines the path along which light propagates through the lens, passing through the centre of curvature of each surface of the lens, and coinciding with the axis of rotational symmetry of the lens.

By identifying the characteristic color preset for the target 2, and thus the measuring rod, in the signal output by the image sensor 32, a representation 21 (see FIGS. 6A, 6B) of the target 2 in the visual image contained in the signal can be identified with ease. Alternatively, a representation of the prism carried by the measuring rod may be identified in the visual image by using a characteristic shape of the prism, for example.

However, the present invention is not restricted to the usage of a characteristic color to identify the representation 21 of the target 2 in the signal output by the image sensor 32. Various methods for identifying a target in an output signal of a detector (such as image sensor) are known from the prior art. Alternatively, the representation 21 of the target 2 may be identified in the signal by comparing the output signal with a preset pattern signal stored in the apparatus 1, for example. Using the signal usually caused by the representation 21 of the respective target 2 in the output signal of the image sensor 32 may generate this preset pattern signal. Thus, the pattern signal may contain information on at least one of shape and color of the target. Alternatively, the target 2, and thus the measuring rod, may be provided with a certain kind of reflector such as a prism to facilitate identification of the representation 21 of the target 2 in the output signal of the image sensor 32, for example.

After the representation 21 of the target 2 has been identified in the output signal of the image sensor 32, the relative position of the target 2 relative to the apparatus 1 is measured. In the present embodiment, this is performed by comparing a position of the representation 21 of the target 2 in the image contained in the signal with a preset position in the image corresponding to the sighting axis 31 of the apparatus 1. In the present embodiment, the position in the image corresponding to the sighting axis 31 of the apparatus 1 is defined by the central pixel of the image sensor 32. Thus, a vertical and horizontal offset of the pixels forming the representation 21 of the target 2 with respect to the central pixel and thus the sighting axis 32 can be measured with ease. It is obvious that any pixel other than the central pixel of the image sensor may be used as reference pixel for defining the sighting axis 32.

Although an image sensor 32 generating a signal comprising a two-dimensional image is used as detector in the present embodiment, the present invention is not restricted to the usage of an image sensor to detect the relative position of the target with respect to the apparatus. To optically detect the position of a target relative to a sighting axis (and thus measurement axis) of a geodetic apparatus, any detector providing a spatial resolution such as a four-quadrant-detector may be used. Alternatively, the relative position of the target with respect to the geodetic apparatus may even be measured by scanning the surroundings of the apparatus e.g. by using a revolving laser system, for example. Furthermore, the position of a target relatively to a sighting axis 31 (and thus measurement axis) of a geodetic apparatus does not have to be detected in an optical way but could also be detected using a radar system or ultrasound, for example.

The electronic distance meter 35 directly measures the distance between the target 2 and the apparatus 1. In the present embodiment is performed by measuring the running time of a light beam emitted by the apparatus 1 and reflected by the prism carried by the measuring rod forming the target 2.

Alternatively, the distance may even be directly detected by using the separate distance detector 35. In FIG. 2, the separate distance detector 35 measures the running time of ultrasound reflected by the target 2.

However, the present invention is not restricted to the above kind of direct distance measurement. Various other kinds of distance detectors suitable for a geodetic apparatus, such as a laser-based distance detector, detectors of the phase comparison type, detectors of the pulse-time measuring type, for example, are known from the prior art and may be used in the apparatus of the present invention.

Alternatively or additionally, measurement of the distance between the target 2 and the apparatus 1 is performed indirectly by using the output signal of the image sensor 32. According to an embodiment this is performed by detecting the length of the representation 21 of the target 2 (and thus the length of the representation of at least one of the measuring rod and the prism) in the vertical direction in the image contained in the signal. The detected length of the representation 21 of the target 2 is then compared with a preset value for the respective target 2 to detect the distance between the target 2 and the apparatus 1.

In the present embodiment, the height meter is also realized by using the image sensor 32. The height meter is capable of detecting a relative height difference between the target 2 and the apparatus 1.

In the present embodiment, this is performed by providing the measuring rod that is used as target 2 with a pattern of alternating light reflectivity arranged in the direction of elongation of the measuring rod. Such patterns of alternating light reflectivity are known from conventional levelling staffs. The controller 5 analyzes the signal output by the image sensor 32 to identify a representation of the pattern. Based on the identified pattern, a levelling signal representing a detected height difference between the apparatus 1 and the target 2 is output by the controller 5.

The function of the geodetic apparatus 1 described above will now be described in more detail by referring to FIGS. 5A, 5B, 6A and 6B.

In FIGS. 5A and 5B, two alternative operating states are shown.

In a first operating state, only the target (measuring rod) 2 is used. In this first operating state, only the second light source 421 is operated to emit the second cone of light 42.

In a second operating state, only the target (measuring rod) 2' is used. The target 2' in the second operating state may be the same target 2 as in the first operating state but located at a different position. In this second operating state, only the first light source 411 is operated to emit the first cone of light 41.

However, both the first and second cones of light 41, 42 are drafted in these FIGS. 5A and 5B as it is a further intention of these Figures to show the amount of overlap between the first and second cones of light 41, 42 in cases were both cones of light are emitted simultaneously.

In the first operating state of FIGS. 5A and 5B the telescope 3 of the geodetic apparatus measures that the target 2 is offset from the sighting axis 31 leftwards and thus in a first direction L opposite to a second direction R. Furthermore, it is measured that the target 2 is offset from a preset position P on the sighting axis 31 backwards and thus in a third direction B opposite to a fourth direction F. Finally, as is obvious from FIG. 5B, the telescope 3 detects that the target 2 is offset from a preset position P on the sighting axis 31 upwardly and thus in a fifth direction U opposite to a sixth direction D.

In FIGS. 5A and 5B, the position of the target 2 relative to the apparatus 1 and relative to the sighting axis 31 is measured by measuring the angle α between the sighting axis 31 and a straight line between the apparatus 1 and target 2 in combination with a measurement of the distance A between the apparatus 1 and the target 2 by using the distance detector (EDM) 35.

Figure 6A:
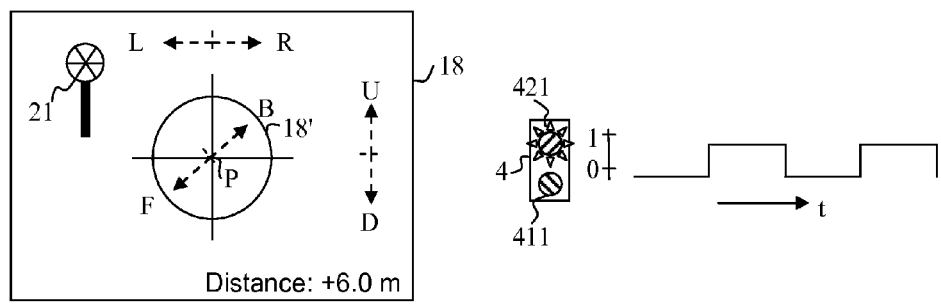
FIGS. 6A-6B show a display and the function of the light emitter in different exemplary operating states corresponding to FIGS. 5A, 5B.

A picture output on the display 18, based on a signal generated by the image sensor 32 of the telescope 3 in the first operating state, is shown in FIG. 6A.

In FIG. 6A, reference sign 21 designates the representation of the target 2. The directions of deviation L, R, F, B, U and D that are indicated in FIG. 6A usually are not visible in the display 18 but shown in the Figure to facilitate understanding of the present invention. Reference sign 18' denotes a reticule superimposed on the output signal of the image sensor 32 to indicate the sighting axis 31.

In the first operating state shown in FIGS. 5A, 5B and 6A using target 2, the controller 5 controls the second light source 421 of the light emitter 4 to output the second cone of light 42. The first light source 411 of the light emitter 4 does not emit light. Output of this second cone of light 42 and thus color symbolizes to a distant user (not shown) operating the target 2 that the target 2 is displaced in a leftward direction L with respect to the sighting axis 31. To indicate to the user that the target 2 is further displaced in a backward direction B, the controller 5 controls the second light source 421 in a way that the second cone of light 42 is not output constantly but as alternating on and off pulses. As shown in FIG. 6A, both the on and off pulses are rather long to indicate to the distant user that the target 2 is displaced in a backward position B with respect to the preset position P along the sighting axis 31. Finally, the controller 5 controls the second light source 421 in a way that a Morse code symbolizing the letter "U" is output at regular intervals (not shown in FIG. 6A). This indicates to the distant user that the target 2 is further displaced in an upward direction U with respect to the preset position P.

Figure 6B:
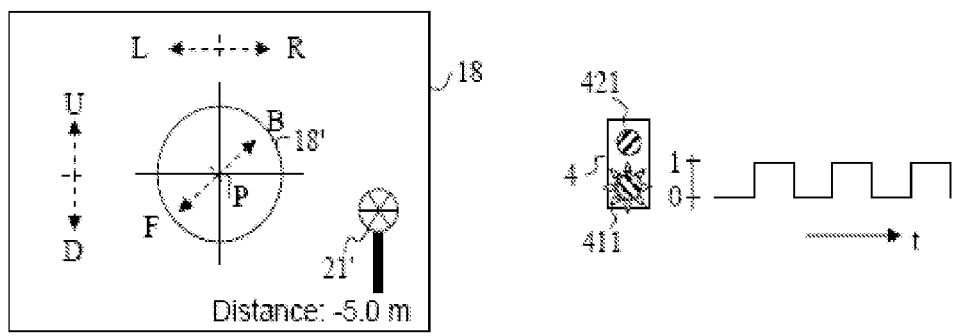

FIG. 6B shows the output of the display 18 and the light emitter 4 in the second operating state shown in FIGS. 5A and 5B and thus in cases were the target 2' is used. In this case, the telescope 3 judges the target 2' to be displaced in a rightward, and thus second, direction R and a forward, and thus fourth, direction F with respect to the preset position P on the sighting axis 31, and in a downward, and thus sixth, direction D with respect to this preset position P.

In the second operating state shown in FIG. 6B, the controller 5 controls the first light source 411 of the light emitter 4 to emit a first cone of light 41 and thus color. The second light source 421 of the light emitter 4 does not emit light. This symbolizes to the distant user that the target 2' is displaced rightward R with respect to the sighting axis 31. Furthermore, the first cone of light 41 is not output constantly but as alternating on and off pulses. The duration of the on and off pulses is rather short to symbolize to the distant user that the target 2' is displaced in a forward direction F with respect to the preset position P. Finally, the controller 5 controls the first light source 411 in a way that a Morse code symbolizing the letter "D" is output to the distant user at regular intervals to inform the user that the target 2' is displaced in a downward position D with respect to the preset position P.

In FIG. 6A, the duration of the on and off pulses is 2 sec whereas in FIG. 6B the duration of on and off pulses is 0.8 sec. In this respect it is preferred that the minimum duration of both the on and off pulses is 0.6 sec to be clearly distinguishable by distant user.

In case the target 2, 2' would be located exactly at the preset position P in the sighting axis 31 of the apparatus 1 (this situation is not shown in the Figures), the controller 5 would control both the first and second light sources 411, 421 to constantly emit both cones of light 41, 42 to symbolize to the user that the target 2, 2' has reached the preset position.

Figure 3A:
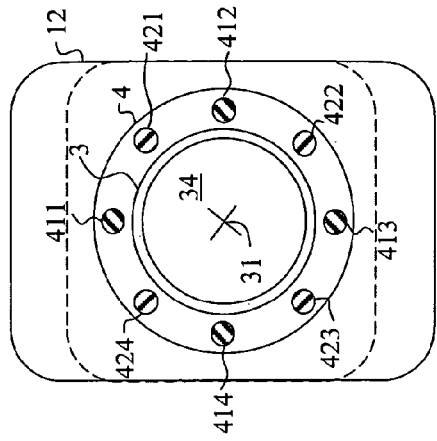
FIGS. 3A-3G schematically show a front view on the measurement unit of the geodetic apparatus according to alternative embodiments.

FIG. 3A shows a front view of the casing of the measurement unit 12 of the apparatus according to the embodiment of FIGS. 1, 2, 5A and 5B.

As is obvious from FIG. 3A, the first and second light sources 411, 421 of the light emitter 4 are arranged adjacent to the objective lens 34 and thus the sighting axis 31. Moreover, the first and second light sources 411, 421 are arranged symmetrically with respect to the sighting axis 31.

However, the present invention is not restricted to such an arrangement of the first and second light sources of the light emitter.

Figure 3B:
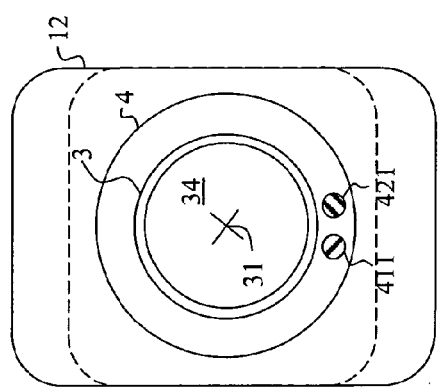
Figure 3C:
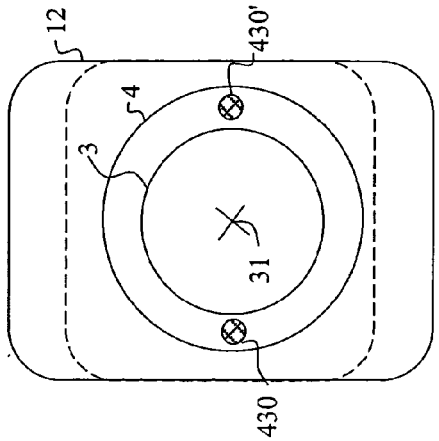
Figure 3D:
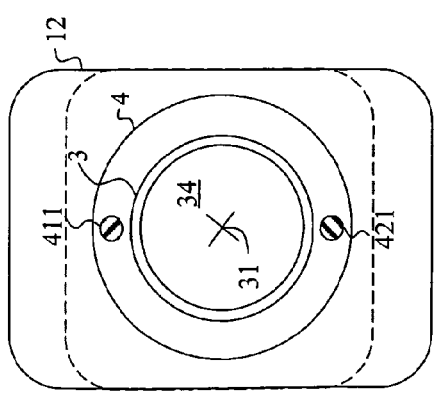
Figure 3E:
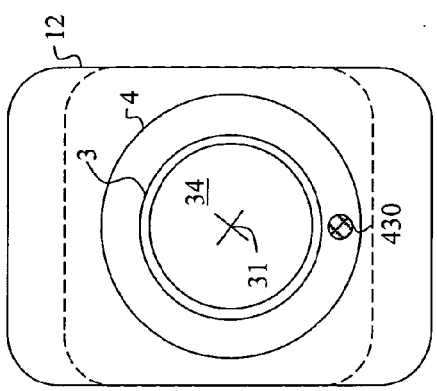
Figure 3F:
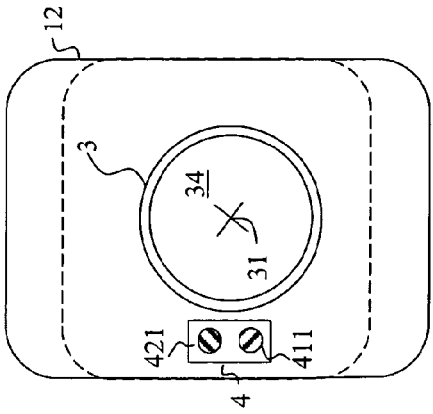
Figure 3G:
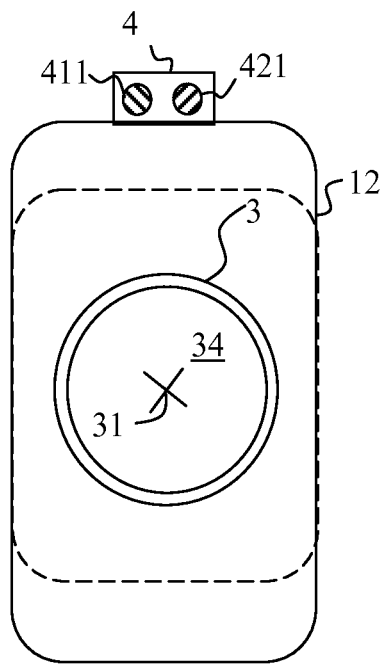

As shown in FIG. 3G, the light emitter 4, and thus the first and second light sources, can also be arranged separate from the objective lens 34 of the telescope 3 on the casing 12 of the telescope 3. Alternatively, the light emitter 4 even may be arranged on the tripod 11.

Furthermore, the first and second light sources 411, 421 of the light emitter 4 may be arranged next to each other in the vicinity of the objective lens 34 of the telescope 3 as is shown in FIGS. 3B and 3D. In this respect, it is not necessary that the light emitter 4 surrounds the objective lens 34.

As is shown in FIG. 3C, the light emitter 4 may even comprise plural pairs of first and second light sources, each pair consisting of a first light source 411, 412, 413, 414 commonly emitting the first cone of light 41 and a second light source commonly 421, 422, 423, 424 emitting the second cone of light 42. This increases the intensity of the first and second cones of light 41, 42. In FIG. 3C the first and second light sources are arranged alternatively and surround the objective lens 34 of the telescope 3.

According to a further alternative embodiment shown in FIGS. 3E, 3F, one common light source 430 is used to emit both the first and second cones of light 41, 42. This common light source 430 may be an LED capable of selectively emitting light having different wavelengths. Alternatively, this common light source 430 may emit white light and be combined with a changeable filter.

As is obvious from FIG. 3F, the light emitter 4 may even comprise multiple common light sources 430, 430' to increase the intensity of the first and second cones of light 41, 42 which are selectively emitted by the common light sources 430, 430'. In FIG. 3F, a measurement unit 12 is shown that does not have an objective lens 34. However, the common light sources 430, 430' are arranged adjacent to the sighting axis 31 of the apparatus.

Figure 4:
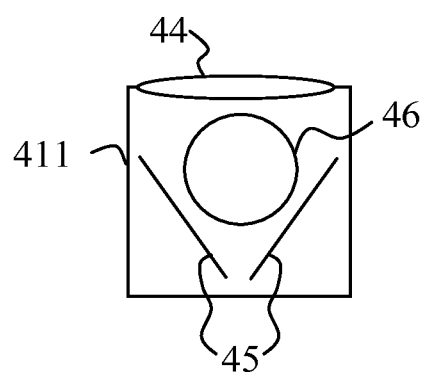
FIG. 4 schematically shows an embodiment of a light source suitable for a light emitter used in the geodetic apparatus of FIG. 1.

As is shown in FIG. 4, in the present embodiments each light source 411 of the light emitter 4 comprises a collimator lens 44 in front of a bulb 46 generating the light. Furthermore, a reflector 45 is arranged behind the bulb 46. Usage of the collimator lens 44 and the reflector 45 increases light emitting efficiency of the light source 411. However, the present invention is not restricted to the use of such light sources as both the collimator lens 44 and the reflector 45 are only optional. Furthermore, the present invention is not restricted to the use of a conventional bulb, as even a glow lamp, an LED, laser diode or discharge lamp may be used for generating the light, for example. Regarding LEDs, the collimator lens 44 may even be part of the LEDs.

Figure 7:
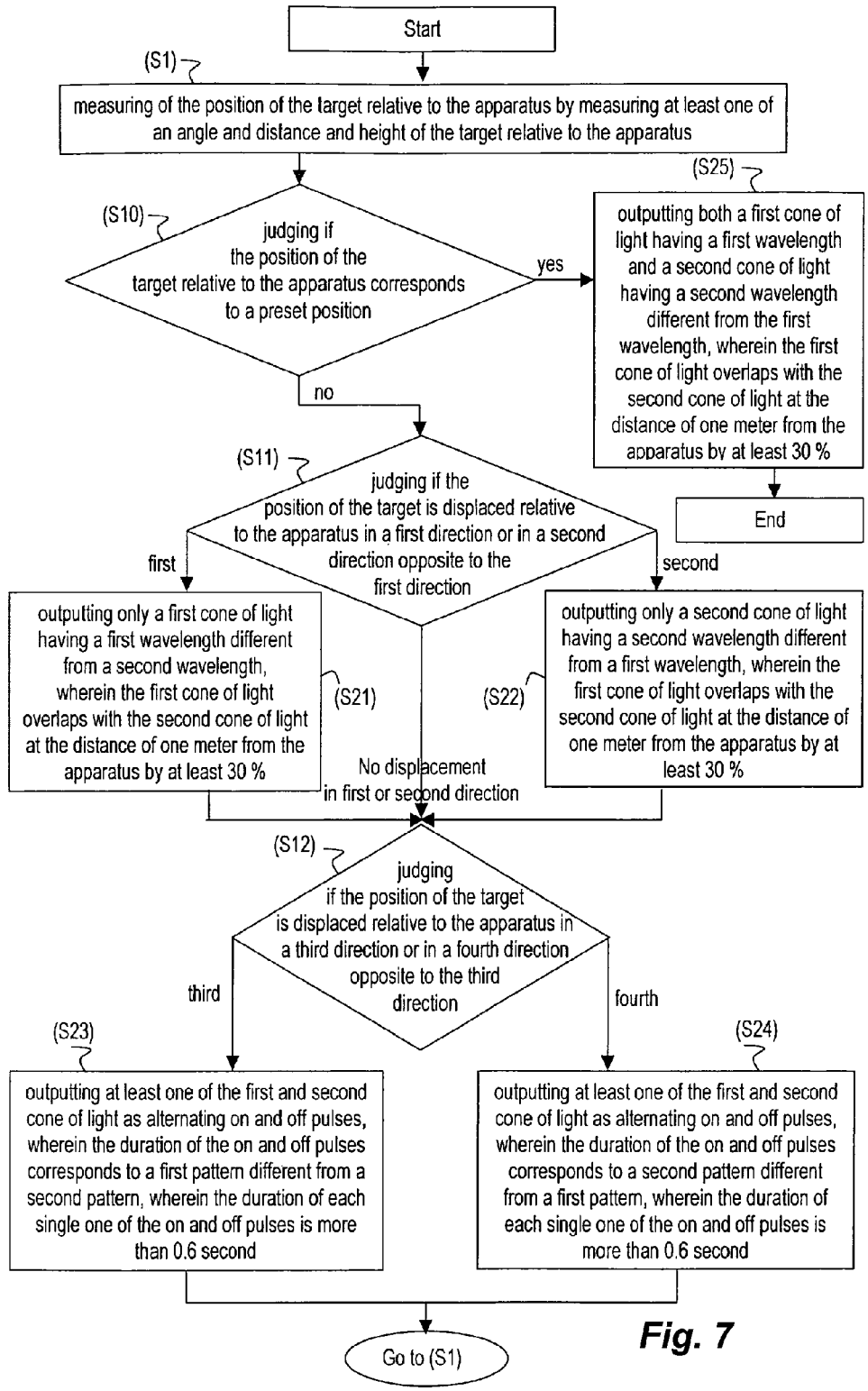
FIG. 7 is a flowchart showing an embodiment of the method for operating the geodetic apparatus.

Finally, an embodiment of a method for controlling a geodetic apparatus when performing measurements using a target is described with reference to FIG. 7.

According to this embodiment, the position of the target relative to the apparatus is measured in a first step S1 by measuring at least one of an angle and distance and height of the target relative to the apparatus.

If the apparatus is an optical geodetic apparatus comprising an image sensor and optics for generating a two-dimensional image on the image sensor, the measuring step S1 may be performed as follows:

Firstly, a position of the representation of the target may be identified in a signal output by the image sensor converting the two-dimensional image into the signal. Secondly the identified position of the presentational target may be compared with a reference position corresponding to a sighting axis of the apparatus. This reference position is defined relative to the image sensor.

After measuring the position of the target in step S1, in method step S10 a determination is made of whether or not the position of the target relative to the apparatus corresponds to a preset position.

If the answer is YES, both a first cone of light having a first wavelength and a second cone of light having a second wavelength different from the first wavelength are output in step S25. In this respect, the first cone of light overlaps the second cone of light at a distance of one meter from the apparatus by at least 30%. The method is then finished.

If the result of the determination step S10 is NO, the position of the target as displaced relative to the apparatus in a first direction or in a second direction opposite to the first direction is determined in step S11.

If the target is judged to be displaced in the first direction, only the first cone of light having the first wavelength different from the second wavelength is output in step S21.

If the target is judged to be displaced in the second direction, only the second cone of light having the second wavelength is output in step S22.

After steps S21 or S22, or in the case were no displacement in the first or second direction is judged in step S11, the position of the target displaced relative to the apparatus in a third direction or in a fourth direction opposite to a third direction and different from the first and second direction is determined in step S12.

In case the position of the target is judged to be displaced in a third direction, the first respectively the second cone of light is output as alternating on and off pulses wherein the duration of the on and off pulses corresponds to a first pattern different to a second pattern in step S23.

Alternatively, if the position of the target is judged to be displaced in a fourth direction, the first respectively second cone of light is output as alternating on and off pulses, wherein the duration of the on and off pulses corresponds to the second pattern in step S24.

In any case, the duration of each of the on and off pulses is more than 0.6 sec to make them distinguishable for a distant user.

After steps S23 respectively S24 the method returns to step S1. Thus, the method is repeated until the position of a target relative to the apparatus is judged in step S10 to correspond to the preset position.

While the invention has been described with respect to a digital tachymeter including an electronic distance meter, a vertical angle meter, a horizontal angle meter and a height meter, it is obvious that the present invention alternatively might be applied to digital tachymeter, including at least one of an electronic distance meter, a vertical angle meter, a horizontal angle meter and a height meter.

For example, the present invention can be applied to a digital theodolite including at least one of a vertical angle meter and a horizontal angle meter. Alternatively, the present invention can be applied to a digital surveyor's level including only a height meter.

Thus, it is not necessary to perform all the above measurements. The only prerequisite is that the geodetic system is capable of generating an image of the field of view and to identify the representation of the measuring bar in this image. Based on the identification result the light sources of the geodetic system are controlled such that the direction of an offset of the representation of the measuring bar in the image with respect to a target position in the image is visualized to a user operating the measuring bar.

In the embodiments described above a measuring bar carrying a prism has been used as target to perform the various measurements. However, it is obvious that measuring bars without a certain reflector or even arbitrary objects may be used as target, dependent on the kind of measurement technology used by the geodetic apparatus. The only prerequisite is that the geodetic system is capable of performing the required measurements with respect to the target.

It should be noted in this context that the terms "comprise", "include", "having" and "with", as well as grammatical modifications thereof used in this specification or in the claims, indicate the presence of technical features such as stated components, figures, integers, steps or the like, and by no means preclude the presence or addition of one or more alternative features, particularly other components, figures, integers, steps or groups thereof.

While the invention has been described with respect to certain exemplary embodiments, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A geodetic apparatus for performing measurements using a target, the apparatus comprising:
   a detector for measuring an offset between the target and a measurement position when a sighting axis of the apparatus is aligned with the measurement position;
   a light emitter for outputting to an outside of the geodetic apparatus a first cone of light having a first wavelength and a second cone of light having a second wavelength different from the first wavelength, wherein the first cone of light overlaps with the second cone of light at a distance of one meter from the apparatus by at least 30%; and
   a controller connected to both the detector and the light emitter, wherein the controller is configured to control said light emitter to output at least one of the first cone of light or the second cone of light based on the offset.

2. The apparatus according to claim 1, wherein the light emitter comprises a first light source emitting the first cone of light and a second light source emitting the second cone of light.

3. The apparatus according to claim 1,
wherein the apparatus comprises a chassis and an objective lens, the objective lens defining an optical axis for the detector; and
wherein the light emitter is located adjacent to the objective lens on the chassis.

4. The apparatus according to claim 3,
wherein the light emitter comprises plural light sources emitting the first cone of light and the second cone of light; and
wherein the light sources are arranged on the chassis surrounding the objective lens.

5. The apparatus according to claim 4, wherein the light emitter comprises a first light source emitting the first cone of light and a second light source emitting the second cone of light.

6. The apparatus according to claim 5, wherein the first cone of light is defined by an angular range comprising 50% of the intensity of light output by the light emitter.

7. The apparatus according to claim 5, wherein the light emitter comprises plural pairs of first and second light sources.

8. The apparatus according to claim 7, wherein the first and second light sources are arranged alternatively to each other.

9. The apparatus according to claim 1, wherein the light emitter comprises at least one common light source alternatively emitting the first cone of light and the second cone of light.

10. The apparatus according to claim 9, wherein the first cone of light is defined by an angular range comprising 50% of the intensity of light output by the light emitter.

11. The apparatus according to claim 1,
wherein the detector comprises an image sensor and optics for generating a two-dimensional image on the image sensor, the image sensor converting the two-dimensional image to an electric signal; and
wherein the controller is configured to detect the offset between the target and the measurement position by identifying a position of a representation of the target in the electric signal output by the image sensor, and by comparing the identified position of the representation of the target with the measurement position corresponding to the sighting axis, the sighting axis being defined relative to the image sensor.

12. The apparatus according to claim 11,
wherein the controller is configured to control said light emitter such that only the first cone of light is output if the offset is in a first direction; and
wherein the controller is configured to control said light emitter such that only the second cone of light is output if the offset is in a second direction opposite to the first direction relative.

13. The apparatus according to claim 12, wherein the controller is configured to control said light emitter such that at least one of the first and second cone of light is output as intermittent light of alternating on and off pulses,
wherein the duration of the on and off pulses corresponds to a first pattern if the offset is in a third direction orthogonal to the first direction;
wherein the duration of the on and off pulses corresponds to a second pattern different from the first pattern if the offset is in a fourth direction opposite to the third direction; and
wherein the duration of each single one of the on and off pulses is more than 0.6 second.

14. The apparatus according to claim 11, wherein the controller is configured to control said light emitter such that both the first cone of light and the second cone of light is output if the offset is zero.

15. The apparatus according to claim 11, wherein the detector is capable of measuring the offset by measuring at least one of an angle and distance and height of the target relative to the sighting axis of the apparatus.

16. The apparatus according to claim 1,
wherein the controller is configured to control said light emitter such that only the first cone of light is output if the offset is in a first direction; and
wherein the controller is configured to control said light emitter such that only the second cone of light is output if the offset is in a second direction opposite to the first direction.

17. The apparatus according to claim 16,
wherein the controller is configured to control said light emitter such that at least one of the first and second cone of light is output as intermittent light of alternating on and off pulses,
wherein the duration of the on and off pulses corresponds to a first pattern if the offset is in a third orthogonal to the first direction;
wherein the duration of the on and off pulses corresponds to a second pattern different from the first pattern if the offset is in a fourth direction relative opposite to the third direction; and
wherein the duration of each single one of the on and off pulses is more than 0.6 second.

18. The apparatus according to claim 1, wherein the controller is configured to control said light emitter such that both the first cone of light and the second cone of light is output if the offset is zero.

19. The apparatus according to claim 1, wherein the detector is capable of measuring the offset by measuring at least one of an angle and distance and height of the target relative to the sighting axis of the apparatus.

20. The apparatus according to claim 1, wherein the first cone of light is defined by an angular range comprising 50% of the intensity of light output by the light emitter.

21. A method for controlling a geodetic apparatus when performing measurements using a target, the method comprising:
measuring an offset between the target and a measurement position when a sighting axis of the apparatus is aligned with the measurement position; and
outputting to an outside of the apparatus at least one of a first cone of light having a first wavelength and a second cone of light having a second wavelength different from the first wavelength, wherein the first cone of light overlaps with the second cone of light at the distance of one meter from the apparatus by at least 30%, and wherein the first and second cone of light are output selectively based on the offset.

22. The method according to claim 21,
wherein the apparatus comprises an image sensor and optics for generating a two-dimensional image on the image sensor, the image sensor converting the two-dimensional image to an electric signal; and
wherein the measuring of the offset between the target and the measurement position comprises identifying a position of a representation of the target in the electric signal output by the image sensor and comparing the identified position of the representation of the target with the measurement position corresponding to the sighting axis, the sighting axis being defined relative to the image sensor.

23. The method according to claim 22,
wherein the measuring of the offset comprises judging if the offset is in a first direction or in a second direction opposite to the first direction; and
wherein the outputting of at least one of the first and second cone of light comprises outputting only the first cone of light if the offset is judged to be in the first direction, and outputting only the second cone of light if the offset is judged to be in the second direction.

24. The method according to claim 23,
wherein the measuring of the offset comprises judging if the offset is in a third direction orthogonal to the first direction or in a fourth direction opposite to the third direction; and
wherein the outputting of at least one of the first and second cone of light comprises outputting at least one of the first and second cone of light as alternating on and off pulses, wherein the duration of the on and off pulses corresponds to a first pattern if the offset is judged to be in the third direction and the duration of the on and off pulses corresponds to a second pattern different from the first pattern if the offset is judged to be in the fourth direction, wherein the duration of each single one of the on and off pulses is more than 0.6 second.

25. The method according to claim 22,
wherein the measuring of the offset comprises determining if the offset is zero; and
wherein the outputting of at least one of the first and second cone of light comprises outputting both the first and second cone of light if the offset is determined be zero.

26. The method according to claim 22, wherein the measuring of the offset comprises measuring at least one of an angle and distance and height of the target relative to the sighting axis of the apparatus.

27. The method according to claim 21,
wherein the measuring of the offset comprises judging if the offset is in a first direction or in a second direction opposite to the first direction; and
wherein the outputting of at least one of the first and second cone of light comprises outputting only the first cone of light if the offset is judged to be in the first direction, and outputting only the second cone of light if the offset is judged to be in the second direction.

28. The method according to claim 27,
wherein the measuring of the offset comprises judging if the offset is in a third direction orthogonal to the first direction or in a fourth direction opposite to the third direction; and
wherein the outputting of at least one of the first and second cone of light comprises outputting at least one of the first and second cone of light as alternating on and off pulses, wherein the duration of the on and off pulses corresponds to a first pattern if the offset is judged to be in the third direction and the duration of the on and off pulses corresponds to a second pattern different from the first pattern if the offset is judged to be in the fourth direction, wherein the duration of each single one of the on and off pulses is more than 0.6 second.

29. The method according to claim 21,
wherein the measuring of the offset of the position of the target relative to the sighting axis of the apparatus comprises determining if the offset is zero; and
wherein the outputting of at least one of the first and second cone of light comprises outputting both the first and second cone of light if the offset is determined to be zero.

30. The method according to claim 21, wherein the measuring of the offset comprises measuring at least one of an angle and distance and height of the target relative to the sighting axis of the apparatus.

* * * * *